US007555892B2

(12) United States Patent
Vosberg

(10) Patent No.: US 7,555,892 B2
(45) Date of Patent: Jul. 7, 2009

(54) COOLING SYSTEM FOR A GAS TURBINE

(75) Inventor: Volker Vosberg, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 567 days.

(21) Appl. No.: 11/233,315

(22) Filed: Sep. 22, 2005

(65) Prior Publication Data

US 2007/0234737 A1 Oct. 11, 2007

(30) Foreign Application Priority Data

Sep. 22, 2004 (EP) ................................. 04022590

(51) Int. Cl.
*F02C 3/30* (2006.01)
*F02C 7/16* (2006.01)

(52) U.S. Cl. ......................... 60/39.53; 60/806; 415/114

(58) Field of Classification Search ................ 60/39.53, 60/39.58, 39.59, 728, 775, 782, 785, 806; 415/114

See application file for complete search history.

(56) References Cited

U.S. PATENT DOCUMENTS 2,647,368 A * 8/1953 Triebbnigg et al. ........... 60/775
3,083,532 A * 4/1963 Cook .......................... 60/728
3,446,481 A * 5/1969 Kydd .......................... 416/92
2002/0108376 A1 8/2002 Stevens
2003/0035717 A1 2/2003 Tiemann

FOREIGN PATENT DOCUMENTS

DE 28 52 057 A1 6/1979
EP 1 418 320 A1 5/2004
FR 1 111 177 2/1956

* cited by examiner

*Primary Examiner*—Louis J Casaregola

(57) ABSTRACT

The invention proposes a cooling system (42) for a gas turbine (1), with an annular duct extending axially in the compressor (5). In the annular duct, a ring (15) of compressor guide blades (14, 28, 33) and a ring (17) of moving blades (16) fastened to a rotor disk (19) of the rotor (3) are provided, with at least one cooling-air extraction point (34), arranged on the rotor (3), for diverting a cooling-air stream into a cooling-duct system arranged in the rotor (3), and with a turbine unit (8), in which, when the gas turbine (1) is in operation, components subjected to thermal stress by a hot gas (20) can be cooled by the divertible cooling-air stream, and also with a feed line (46) for feeding a liquid (45) into the cooling-air stream. In order to make it possible to feed a liquid into the cooling-air stream simply and cost-effectively, the invention proposes that the feed line (46) extend with a subduct (44) through at least one of the compressor guide blades (28, 33) of the ring (15), and the orifice (48, 49) for the outlet of the liquid (45) be connected in the region of the cooling-air extraction point (34).

9 Claims, 3 Drawing Sheets

9
14
13
17
15
8
18
16
19
20
6
3
12
7
11
1
16,17
18
14,15
19
5
10
L
2
4

1
2
3
5
6
10
11
12
14
14,33
15
16
17
18
19
19'
19''
20
22
24
26
28
32
34'
34''
36'
36''
38'
38''
40'
40''
42
44
46
48
48,26
50
52
R 46
32
18
45
64
10
44
30
14,28
64
64
54
26
60
48
58
24
3
49
56
62
70
34
19
19
38

COOLING SYSTEM FOR A GAS TURBINE

CROSS REFERENCE TO RELATED APPLICATION

This application claims priority of the European application 04022590.6 EP filed Sep. 22, 2004, which is incorporated by reference herein in its entirety.

FIELD OF THE INVENTION

The invention relates to a cooling system for a gas turbine, with an annular duct, extending axially along a rotor, of a compressor, in which at least one ring of compressor guide blades fastened fixedly in terms of rotation and at least one ring of moving blades fastened to a rotor disk of the rotor are provided, which blades have in each case a securable blade root on which a blade profile and, following the latter, a blade head are formed, with at least one cooling-air extraction point, arranged on the rotor, for diverting a cooling-air stream into a cooling-duct system arranged in the rotor, and with a turbine unit, in which, when the gas turbine is in operation, components subjected to thermal stress by a hot gas can be cooled by the divertible cooling-air stream, and also with a feed line for feeding a liquid into the cooling-air stream, said feed line having at least one orifice for the outlet of the liquid.

BACKGROUND OF THE INVENTION

Such a cooling system for a gas turbine is known from the laid-open publication DE 28 52 057. To cool the cooling air extracted from the compressor mass flow, a liquid is injected into the cooling-air stream. A first variant shows a tube which carries a liquid and which is led through the diffuser arranged at the exit of the compressor, so that the cooling air diverted into the rotor is cooled as a result of the generation of latent heat. A further variant shows a tube which extends in the axial direction and runs in the rotor and which has an orifice through which a liquid is injected downstream of the cooling-air extraction point for cooling air. The third variant proposes to extract cooling air from the diffuser and cool it in an external chamber as a result of the generation of latent heat, so as then to make the cooled cooling air available again for the turbine unit.

It has proved a disadvantage, as regards the first variant, that the tube passing through the diffuser obstructs the flow in the diffuser. The second variant has the disadvantage that the liquid has to be transferred to the rotating system, but this is not trivial and entails an increased outlay in technical terms. The disadvantage of the third variant is that a substantial proportion of the cooling-air flow has to be fed out of the gas turbine and, after external cooling, fed to the gas turbine again, this also leading to complicated structures.

SUMMARY OF THE INVENTION

On this basis, the object of the invention is to specify a cooling system for a gas turbine of the type initially mentioned, in which a simple and cost-effective feed of a liquid into the cooling-air stream becomes possible, so that, if appropriate, already existing gas turbines can also be equipped or retrofitted cost-effectively with such cooling-air cooling. Furthermore, for this purpose, the object of the invention is to specify a compressor guide blade and a method for cooling a gas turbine.

The object aimed at the cooling system of a gas turbine is achieved by means of the features of the claims, the object aimed at a compressor guide blade is achieved by means of the features of the claims, and the object aimed at the method is achieved by means of the features of the claims.

All the solutions are in this case based on an inventive idea: the liquid can be injected into the cooling-air stream simply and cost-effectively, in the region of the cooling-air extraction point, when the feed line extends with a subduct through at least one of the compressor guide blades of the ring, and the orifice for the outlet of the liquid is connected in the region of the cooling-air extraction point.

The disadvantages arising from the known prior art can thus be avoided completely.

Even when cooling-air cooling is to be retrofitted for already existing gas turbines, this can be implemented very simply, in that at least one compressor guide blade of a ring, said compressor guide blade terminating on the head side in the region of the cooling-air extraction point, is exchanged in each case by a compressor guide blade which has a subduct of the feed line for leading through a liquid, which subduct can be connected on the blade-root side to the feed line for feeding the liquid and on the blade-head side has at least one orifice for the outlet of the liquid. To complete the cooling-air cooling, the newly mounted compressor guide blades are merely to be connected to or equipped with the feed line for feeding the liquid to the compressor guide blades, so that an existing gas turbine can be retrofitted with cooling-air cooling simply and cost-effectively.

Advantageous embodiments are specified in the subclaims.

In an advantageous embodiment, it is proposed that the rotor have at least two directly adjacent rotor disks, between which is provided a radially outwardly open disk interspace, into which the blade heads of the compressor guide blades of the ring project. A disk interspace formed at this point makes it possible in a particularly simple way to feed the liquid into the region of the cooling-air extraction point.

Preferably, a plurality of compressor guide blades of the ring which are distributed symmetrically over the circumference have in each case a subduct of the feed line and orifices for the outlet of the liquid. An equalization of the cooling-air cooling thus takes place, since cooling-air extraction points distributed over the circumference of the rotor can divert uniformly cooled cooling air.

In addition to free-standing compressor guide blades, in a further advantageous embodiment, compressor guide blades fastened on both sides may also be designed according to the invention. For this purpose, the blade heads, facing the rotor, of the compressor guide blades of the ring are secured to a fastening ring which has for the liquid at least one passage duct with orifices for the outlet of the liquid into the disk interspace. Thus, compressor guide blades either free-standing or secured on the head side may be designed according to the invention.

The measure proves advantageous in which the fastening ring has a number of passages and orifices for the outlet of the liquid which are distributed symmetrically over the circumference. Here, too, a uniform homogeneous cooling of the cooling air in the disk interspace can take place.

Low fluidic losses during the diversion of the cooling air are exhibited by the embodiment in which each orifice issuing into the disk interspace is located opposite a cooling-air extraction point.

A particularly rapid evaporation of the injected liquid, which increases the cooling efficiency, can be achieved if the orifices issuing into the disk interspace are of nozzle-shaped design. As a result, the injected liquid is atomized into fine droplets which evaporate substantially more simply and more quickly and thus extract heat from the surroundings, that is to say from the cooling air to be diverted.

The embodiment has proved particularly advantageous in which each orifice is shaped in such a way that the inflowing liquid has imparted to it a flow component which is directed in the circumferential direction of the rotor and which is identical to a direction-of-rotation component of the rotor. As a result, both the liquid and the cooling air present in the disk interspace are set in a swirl which is directed in the circumferential direction and which corresponds to the direction of rotation of the rotor, so that the inflow of the cooled cooling air into the cooling-air extraction point can take place with a lower loss and more efficiently.

Preferably, the feed line for feeding the liquid comprises a setting member, by means of which the fed quantity of liquid per unit time can be set. As a result, a predetermined quantity of liquid can be set for any desired operating state of the gas turbine, the result of this being that the cooling air can be cooled, as required, according to the operating conditions of the gas turbine. The fed quantity of liquid can optionally be adapted by a controller acting on the setting member.

In a preferred embodiment of a compressor guide blade which has a subduct of the feed line for leading through a liquid, it is proposed that the subduct of the feed line be a cavity, a tube or a bore. The liquid can thereby be routed simply and cost-effectively from outside through the flow duct of the gas turbine or of the compressor, without causing flow losses in the medium flowing in the flow duct.

Since the liquid is introduced into the cooling-air stream upline from the cooling-air extraction point, the cooling-air flow can be provided with a swirl which causes a lower loss in the transition of the cooling-air flow from the stationary system into the rotor.

The liquid is expediently water, in particular distilled water.

The cooling method according to the invention may in this case be carried out both during the operation of the gas turbine and after operation during a cooling phase for the more rapid cooling of the rotor. This immediately affords two advantages: during operation, the cooling of the cooling air can be adapted to the instantaneous operating or load state of the gas turbine, and, during a cooling phase carried out after the operation of a gas turbine, the heat stored inside the rotor can be discharged outward more quickly. This, on the one hand, assists the starting behavior of a not fully cooled gas turbine (warm-starting behavior) and, on the other hand, reduces the standstill times of the gas turbine, in that servicing and/or maintenance work can be commenced at an earlier stage since the gas turbine is completely cooled more quickly.

BRIEF DESCRIPTION OF THE DRAWINGS

The invention is explained with reference to a drawing in which.

DETAILED DESCRIPTION OF THE INVENTION

Figure 1:
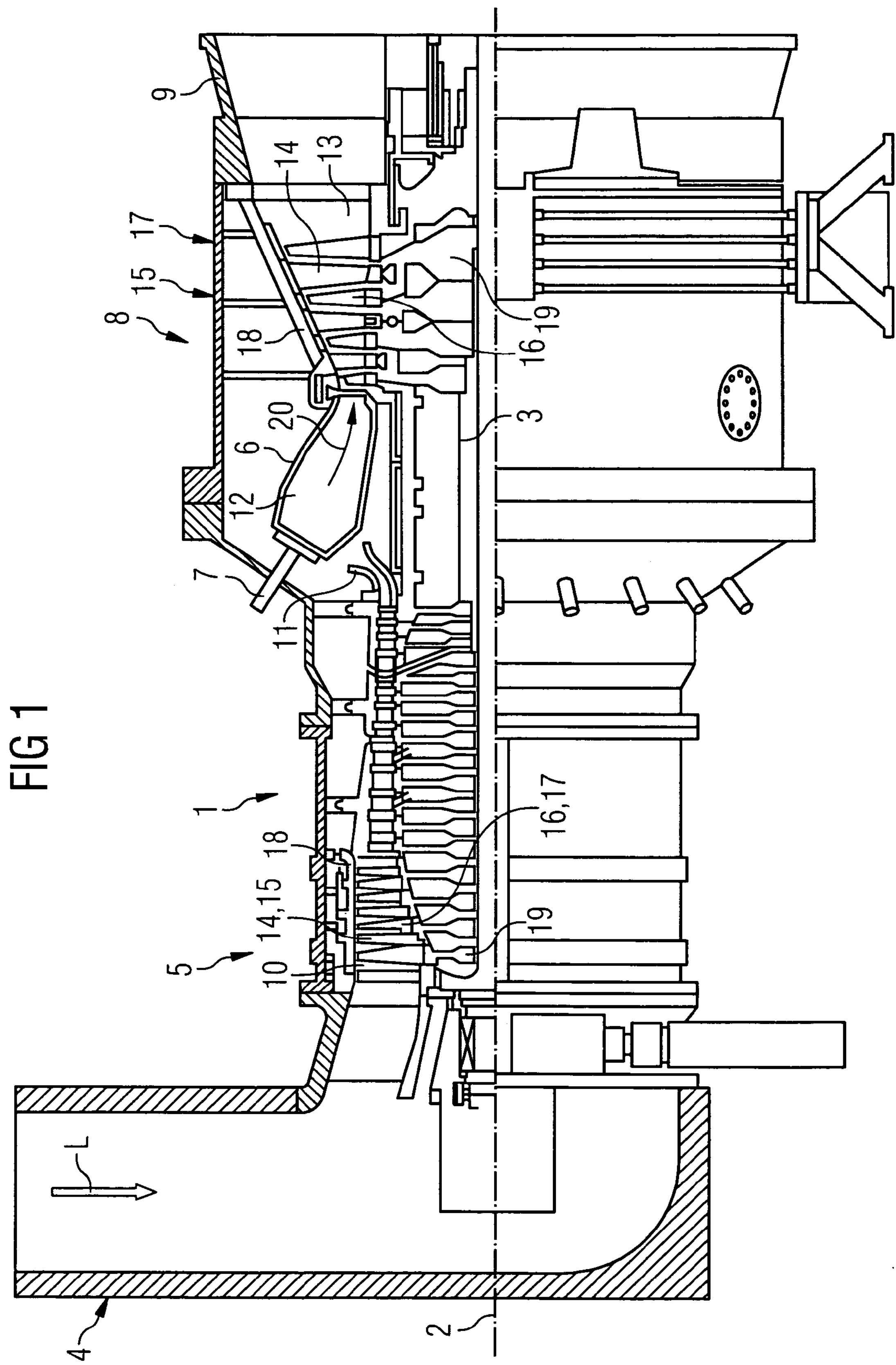
FIG. 1 shows a gas turbine with a compressor in a longitudinal part section.

FIG. 1 shows a gas turbine 1 in a longitudinal part section. It has, inside it, a rotor 3 which is rotationally mounted about an axial rotation 2 which is designated as a turbine rotor. An intake casing 4, a compressor 5, a torus-like annular combustion chamber 6 with a plurality of annularly arranged burners 7, a turbine unit 8 and an exhaust gas casing 9 succeed one another along the rotor 3.

In the compressor 5, an annular compressor duct 10 is provided, which narrows in cross section in the direction of the annular combustion chamber 6. At the exit, on the combustion-chamber side, of the compressor 5, a diffuser 11 is arranged which is flow-connected to the annular combustion chamber 6. The annular combustion chamber 6 forms a combustion space 12 for a mixture consisting of a fuel and of compressed air. A hot-gas duct 13 is flow-connected to the combustion space 12, the hot-gas duct 13 being followed by the exhaust gas casing 9.

Blade rings are arranged in each case alternately in the compressor duct 10 and in the hot-gas duct 13. A guide blade ring 15 formed from guide blades 14 is followed in each case by a moving blade ring 17 formed from moving blades 16. The fixed guide blades 14 are in this case connected to a casing 18, whereas the moving blades 16 are connected to the rotor 3 in each case by means of a rotor disk 19.

The rotor 3 of the compressor 5 is composed of a plurality of rotor disks 19 which, arranged so as to be stacked in the axial direction, are braced by a central tie.

Figure 2:
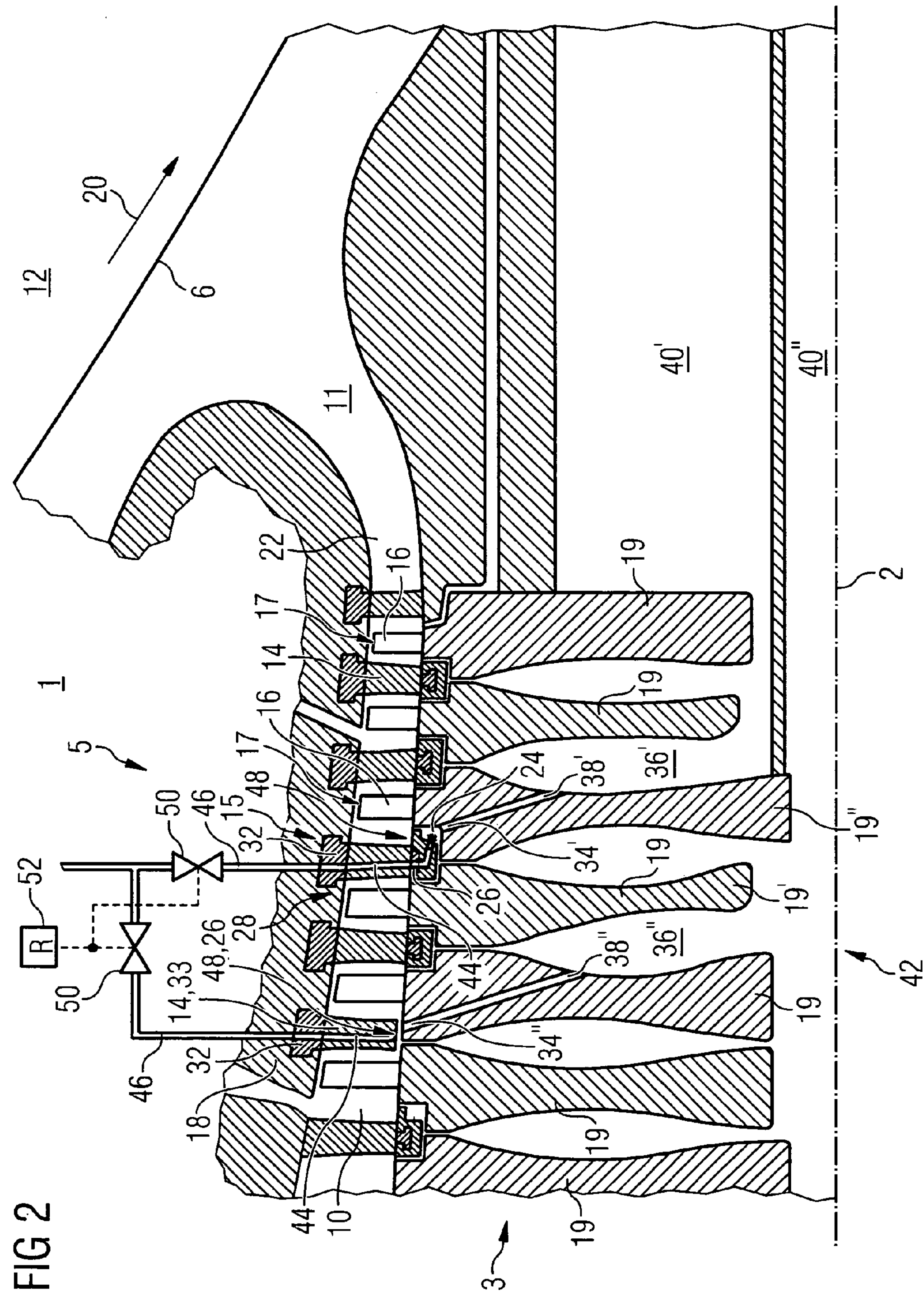
FIG. 2 shows a detail of the compressor in a longitudinal section.

FIG. 2 shows a detail of a compressor 5 of a gas turbine 1. In the compressor duct 10, ambient air sucked in by means of the cascading arrangement of guide blade rings 15 and moving blade rings 17 is compressed and is provided at the exit 22 of the compressor 5, that is to say at the inlet of a following diffuser 11. Between two directly adjacent rotor disks 19, for example between the rotor disks designated by 19', 19", is formed a disk interspace 24 in which the blade heads 26 of compressor guide blades 28 project. The compressor guide blades 28 have a blade profile 30 which has adjoining it a blade root 32 secured in the casing 18.

At least one of the two rotor disks 19', 19" has a cooling-air extraction point 34' which is adjacent to the disk interspace 24. Furthermore, a further rotor disk 19'" has a further cooling-air extraction point 34" which lies opposite a compressor guide blade 33 free-standing on the head side.

Each cooling-air extraction point 34' has adjoining it a duct 38' which extends approximately radially through the rotor disk 19" and which issues into a cavity 36' arranged in the rotor 3. The cavity 36' is flow-connected, via an annular duct 40' extending in the axial direction, to the moving blades 16, not illustrated in FIG. 2, of a turbine stage for the turbine unit 8, said moving blades being acted upon by cooling air. The cooling-air extraction point 34" likewise forms, with a duct 38", a cavity 36" and an annular duct 40', a portion of the flow path for the cooling air.

For the cooling system 42, the compressor guide blades 28, 33 which are located opposite a cooling-air extraction point 34 have in each case a subduct 44 of a feed line 46 for leading through a liquid 45, which subduct 44 is provided on the blade-root side with the feed line 46 for feeding the liquid 45 and on the blade-head side with at least one orifice 48 for the outlet of the liquid 45 in the region of the cooling-air extraction point 34. On the blade-root side, the feed line 46, for example a tube, is connected to a shut-off or setting member, for example a valve 50, which member can be activated by a controller 52, in order to set according to the operating conditions of the gas turbine 1 or to regulate around a turbine blade temperature the quantity of liquid 45 flowing through per unit time.

Figure 3:
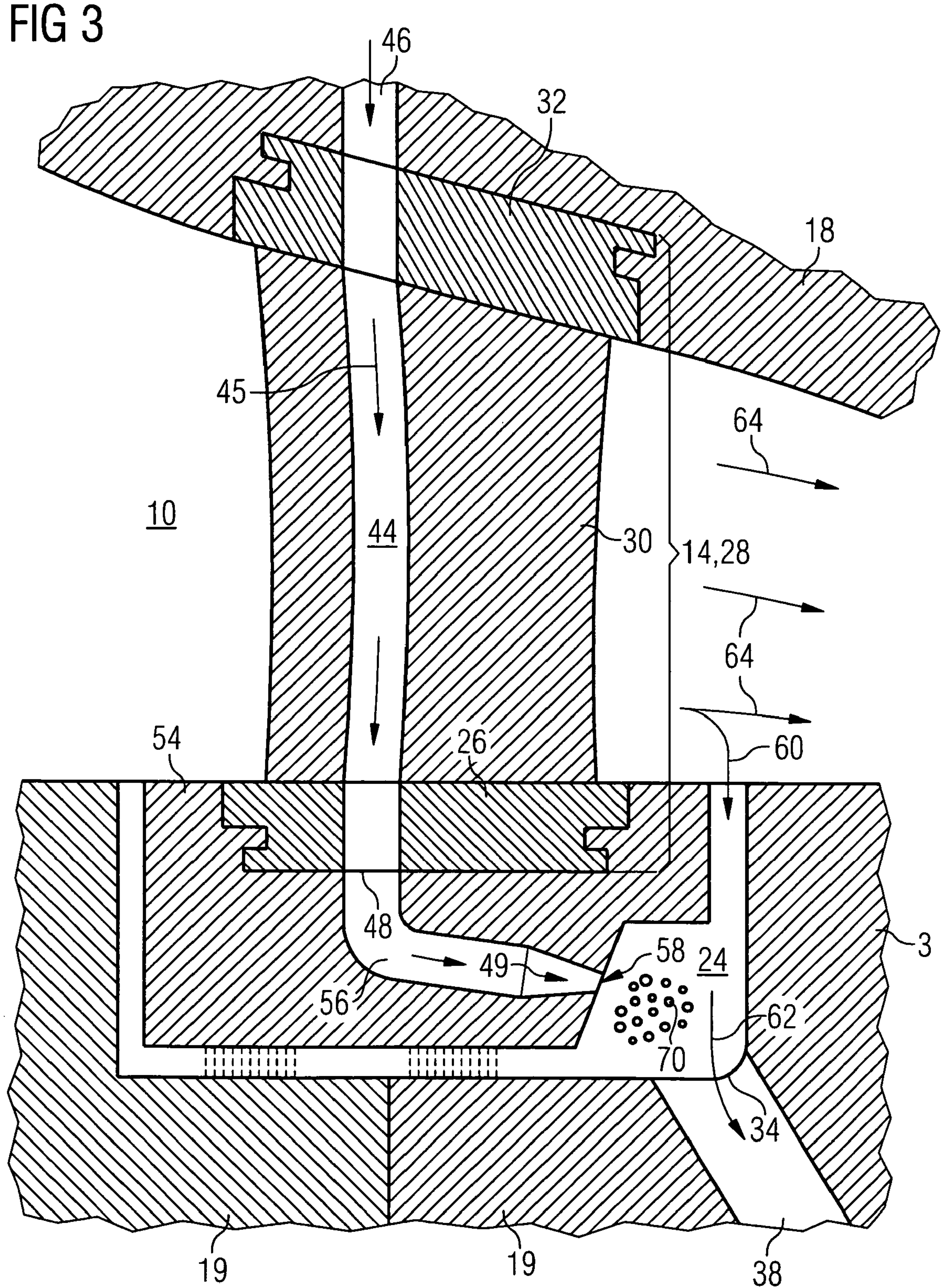
FIG. 3 shows a compressor guide blade according to the invention with a fastening ring in the compressor, in section.

FIG. 3 shows in detail the compressor guide blade 28 according to the invention. The compressor guide blade 28 has a blade root 32 which is secured in the casing 18 and which has adjoining it the blade profile 30 which the blade head 26 adjoins. The blade heads 26 of a guide blade ring 15 are in this case held on the rotor side by a fastening ring 54.

The fastening ring 54 has, at least at the points where the compressor guide blades 28 have subducts 44 for leading through a liquid 45, a passage duct 56, the first end of which is located opposite the orifice 48 integrally formed with the compressor guide blade 28 and the second end of which is designed in the form of a nozzle 58. The second end of the passage duct 56 is located, as an orifice 59, opposite the cooling-air extraction point 34.

The subduct 44 may be, for example, a bore which runs through a solid compressor guide blade 28. Alternatively, the subduct 44 could be a cavity, if appropriate also a production-induced cavity of the compressor guide blade 28 or a tube which runs in this cavity.

Normally, each rotor disk 19 has a number of cooling-air extraction points 34 which are distributed symmetrically over its circumference. Preferably, the guide blade ring 15 which is assigned to the cooling-air extraction points 34 has a number, identical to the cooling-air extraction points 34, of orifices 48 which are distributed over the circumference correspondingly to the cooling-air extraction points 34.

While the compressor 5 is in operation, air flowing through the compressor duct 10 is compressed. A part flow of this compressed air is diverted from the main flow 64 via the disk interspace 24 according to the arrows 60, 62. To cool the part flow 60, 62 used later as cooling air, the liquid 45, preferably distilled water (demineralized water), routed via the feed line 46, the subduct 44, the orifice 48, the passage duct 56 and the nozzle 58 can be injected into the disk interspace 24 in the region of the cooling-air extraction point 34. By means of the nozzle 58, the liquid 45 is atomized into very small droplets 70, with the result that these evaporate particularly simply and extract heat from the diverted part flow 60, 62.

As a result of the rotation of the rotor 3, the cooling-air extraction points 34 rotate below and beyond the orifices 48, 49 or run past these, but, with the rotors stationary, it is possible that the cooling-air extraction points 34 and the orifices 49, in the case of compressor guide blades 28 secured on the head side, and the orifices 48, in the case of compressor guide blades 33 free-standing on the head side (FIG. 2), lie opposite one another.

The passage duct 56 and/or the nozzle 58 are/is shaped in such a way that the injected liquid 45 has a flow component which is directed in the circumferential direction of the rotor 3 and which corresponds to the direction-of-rotation component of the rotor 3. As a result, during the injection operation, the part stream 60, 62 is accelerated in the direction in which the rotor 3 rotates, so that the cooled part flow 60, 62 can flow as a cooling-air stream more easily into the cooling-air extraction point 34.

In an alternative embodiment, instead of the compressor guide blade 28 secured on the head side in the fastening ring 54, free-standing compressor guide blades 33 could also be equipped with the feed line 46 for feeding a liquid 45, in order to inject a liquid 45 for cooling the cooling air into the cooling-air stream which can be diverted from the rotor 3.

The invention claimed is:

1. A cooling system for a gas turbine, comprising:

an annular duct extending axially along a compressor portion of a rotor;

at least one ring of a plurality of compressor guide blades fastened fixedly in terms of rotation, the compressor guide blades comprising:

a securable blade root on which a blade profile and, following the latter, a blade head are formed;

at least one cooling-air extraction point, arranged on the rotor, for diverting a cooling-air stream into a cooling-duct system arranged in the rotor and with a turbine unit; and at least one ring of moving blades fastened to a rotor disk of the rotor are provided, where each ring of moving blades is associated with one ring of compressor guide blades in each case, wherein when the gas turbine is in operation, components subjected to thermal stress by a hot gas cooled are by the divertible cooling-air stream, and also with a feed line for feeding a liquid into the cooling-air stream, the feed line having at least one orifice for the outlet of the liquid such that the feed line extends with a subduct through at least one of the compressor guide blades of the ring, and the orifice for the outlet of the liquid is connected in the region of the cooling-air extraction point, wherein the rotor has at least two directly adjacent rotor disks, between which is provided a radially outwardly open disk interspace, into which the blade heads of the compressor guide blades of the ring project.

2. The cooling system as claimed in claim 1, wherein a Plurality of compressor guide blades of the ring which are distributed symmertrically over the circumference have a subduct of the feed line and orfices for the outlet of the liquid.

3. The cooling system as claimed in claim 1, wherein the blade heads of the compressor guide blades of the ring are secured to a fastening ring which has for the liquid at least one passage duct with the orfice for the outlet of the liquid into the disk interspace.

4. The cooling system as claimed in claim 3, wherein the fastening ring has a number of passages and orifices for the outlet of the liquid which are distributed symmetrically over the circumference.

5. The cooling system as claimed in claim 1, wherein each orifice issuing into the disk interspace is located opposite the cooling-air extraction point.

6. The cooling system as claimed in claim 1, wherein each orifice issuing into the disk interspace is of nozzle-shaped design.

7. The cooling system as claimed in claim 1, characterized in that the orifice is shaped in such a way that the liquid has a flow component which is directed in the circumferential direction of the rotor and which is identical to a direction-of-rotation component of the rotor.

8. The cooling system as claimed in claim 1, wherein the feed line for feeding the liquid comprises a setting member, by means of which the fed quantity of liquid per unit time can be set.

9. The cooling system as claimed in claim 8, wherein the fed quantity of liquid can be adapted by a controller acting on the setting member.

* * * * *